US011248908B2

(12) United States Patent
Ivanov et al.

(10) Patent No.: US 11,248,908 B2
(45) Date of Patent: Feb. 15, 2022

(54) PRECISE ALTITUDE ESTIMATION FOR INDOOR POSITIONING

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjärinne, Tampere (FI); Muhammad Irshan Khan, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 270 days.

(21) Appl. No.: 15/441,357

(22) Filed: Feb. 24, 2017

(65) Prior Publication Data
US 2018/0245916 A1 Aug. 30, 2018

(51) Int. Cl.
G01C 5/06 (2006.01)
G01C 21/20 (2006.01)
(Continued)

(52) U.S. Cl.
CPC .............. *G01C 5/06* (2013.01); *G01C 21/206* (2013.01); *G01S 5/015* (2020.05); *G01S 19/01* (2013.01);
(Continued)

(58) Field of Classification Search
None
See application file for complete search history.

(56) References Cited

U.S. PATENT DOCUMENTS 5,646,857 A * 7/1997 McBurney ............... G01C 5/00
701/469
6,094,607 A 7/2000 Diesel
(Continued)

FOREIGN PATENT DOCUMENTS

CN 101000244 A 7/2007
CN 101666643 A 3/2010
(Continued)

OTHER PUBLICATIONS

Wekel et al; "Mono Vision Based Construction of Elevation Maps in Indoor Environments"; 8th WSEAS International Conference on Signal Processing, Computational Geometry and Artificial Vision (ISCGAV'08) Rhodes, Greece, Aug. 20-22, 2008 (Year: 2008).*
(Continued)

Primary Examiner — Arleen M Vazquez
Assistant Examiner — Leonard S Liang
(74) Attorney, Agent, or Firm — Lempia Summerfield Katz LLC

(57) ABSTRACT

A method is disclosed comprising: determining at least one relative altitude information based, at least in part, on at least one pressure information, wherein the at least one relative altitude information is indicative of a relative value of an altitude, determining at least one absolute altitude information associated with a data element of a database comprising map data, wherein the at least one absolute altitude information is indicative of an absolute value of an altitude, determining an estimation information based, at least in part, on the determined relative altitude information and, at least in part, on the determined absolute altitude information, wherein the estimation information represents an absolute value of an altitude. It is further disclosed an according apparatus, computer program and system.

20 Claims, 7 Drawing Sheets

(51) Int. Cl.
| | |
|---|---|
| *H04W 4/02* | (2018.01) |
| *G01S 19/01* | (2010.01) |
| *G01S 19/53* | (2010.01) |
| *G01S 19/50* | (2010.01) |
| *G01S 19/45* | (2010.01) |
| *G01S 5/00* | (2006.01) |
| *H04W 64/00* | (2009.01) |
| *G01S 5/02* | (2010.01) |
| *H04W 4/029* | (2018.01) |
| *G01C 21/00* | (2006.01) |
| *G01C 21/16* | (2006.01) |

(52) U.S. Cl.
CPC .............. *G01S 19/45* (2013.01); *G01S 19/50* (2013.01); *G01S 19/53* (2013.01); *H04W 4/025* (2013.01); *G01C 21/005* (2013.01); *G01C 21/165* (2013.01); *G01S 5/0252* (2013.01); *G01S 5/0257* (2013.01); *H04W 4/023* (2013.01); *H04W 4/029* (2018.02); *H04W 64/006* (2013.01)

(56) References Cited

U.S. PATENT DOCUMENTS

| | | | | |
|---|---|---|---|---|
| 6,201,544 | B1* | 3/2001 | Ezaki ................. | G01C 21/3638 345/419 |
| 7,035,650 | B1* | 4/2006 | Moskowitz ........... | G01C 21/20 340/995.23 |
| 7,162,368 | B2* | 1/2007 | Levi ........................ | G01C 5/06 701/300 |
| 7,397,357 | B2* | 7/2008 | Krumm ................... | G01W 1/17 340/501 |
| 8,180,591 | B2 | 5/2012 | Yuen et al. | |
| 8,320,938 | B2* | 11/2012 | Meyer .................... | G01S 5/021 370/310.2 |
| 8,666,158 | B2* | 3/2014 | Strassenburg-Kleciak ................. | G06K 9/4652 345/419 |
| 8,990,043 | B1* | 3/2015 | Kolodziej ................ | G01C 5/06 702/150 |
| 9,131,347 | B2 | 9/2015 | Venkatraman et al. | |
| 9,188,458 | B2* | 11/2015 | Itagaki ............... | G01C 21/3676 |
| 9,234,965 | B2* | 1/2016 | Venkatraman .......... | G01C 5/06 |
| 9,462,568 | B2* | 10/2016 | Krallman ............. | H04W 64/00 |
| 9,671,224 | B2* | 6/2017 | Karvounis .............. | G01C 5/00 |
| 9,763,051 | B2* | 9/2017 | Belghoul ............... | G01S 5/0236 |
| 9,983,002 | B2* | 5/2018 | Jackson .................. | G01C 5/06 |
| 2003/0023399 | A1* | 1/2003 | Yun .......................... | G01C 5/06 702/138 |
| 2005/0197769 | A1 | 9/2005 | Hawkinson et al. | |
| 2007/0282565 | A1* | 12/2007 | Bye ...................... | G01C 21/206 702/158 |
| 2009/0128406 | A1* | 5/2009 | Alanen .................. | G01S 19/32 342/357.42 |
| 2009/0143983 | A1 | 6/2009 | Venkatraman et al. | |
| 2009/0228209 | A1* | 9/2009 | Alanen .................. | G01S 19/33 701/472 |
| 2010/0049469 | A1* | 2/2010 | Wirola ..................... | G01C 5/06 702/150 |
| 2010/0138147 | A1* | 6/2010 | T'Siobbel ............ | G01C 21/165 701/533 |
| 2010/0250134 | A1* | 9/2010 | Bornstein ............... | G01C 21/12 701/500 |
| 2011/0106449 | A1 | 5/2011 | Chowdhary et al. | |
| 2011/0199257 | A1 | 8/2011 | Lundgren et al. | |
| 2012/0072110 | A1* | 3/2012 | Venkatraman ........... | G01C 5/06 701/434 |
| 2012/0083705 | A1* | 4/2012 | Yuen ...................... | G16H 20/30 600/508 |
| 2012/0182180 | A1* | 7/2012 | Wolf ........................ | G01S 5/14 342/357.29 |
| 2012/0290253 | A1* | 11/2012 | Barrett ................... | G01C 5/06 702/150 |
| 2013/0289871 | A1* | 10/2013 | Itagaki ................... | G01C 21/00 701/410 |
| 2013/0325385 | A1* | 12/2013 | Shin ....................... | G01C 5/06 702/94 |
| 2014/0012529 | A1* | 1/2014 | Lee ......................... | G01C 5/06 702/94 |
| 2014/0114567 | A1* | 4/2014 | Buchanan ............ | G01C 21/005 701/454 |
| 2014/0135040 | A1* | 5/2014 | Edge ..................... | H04W 4/025 455/456.6 |
| 2014/0179341 | A1 | 6/2014 | Sydir et al. | |
| 2014/0200846 | A1* | 7/2014 | Wachter ................. | G01C 5/06 702/138 |
| 2014/0274151 | A1* | 9/2014 | Pattabiraman ........ | H04W 4/029 455/456.3 |
| 2014/0278060 | A1* | 9/2014 | Kordari ................ | G01C 21/206 701/422 |
| 2014/0308976 | A1* | 10/2014 | Garin ..................... | G01S 5/0226 455/456.2 |
| 2014/0323160 | A1* | 10/2014 | Venkatraman ........ | H04W 4/029 455/456.6 |
| 2014/0335894 | A1* | 11/2014 | Wirola .................. | H04W 64/00 455/456.1 |
| 2015/0006100 | A1* | 1/2015 | Jackson ................. | G01C 5/06 702/94 |
| 2015/0133145 | A1 | 5/2015 | Palanki et al. | |
| 2015/0163634 | A1 | 6/2015 | Meredith et al. | |
| 2015/0247917 | A1* | 9/2015 | Gum ..................... | G01S 5/0263 342/452 |
| 2015/0249907 | A1* | 9/2015 | Gupta ................... | H04W 4/043 455/456.1 |
| 2016/0033266 | A1* | 2/2016 | Le Grand ............... | G01S 19/01 702/150 |
| 2016/0040992 | A1* | 2/2016 | Palella ..................... | G01C 5/06 702/152 |
| 2016/0047648 | A1 | 2/2016 | Edge et al. | |
| 2016/0102995 | A1* | 4/2016 | Gum ....................... | G01C 5/06 702/98 |
| 2016/0234645 | A1* | 8/2016 | Belghoul ................ | G01C 5/06 |
| 2016/0245716 | A1* | 8/2016 | Gum ....................... | G01C 5/06 |
| 2016/0258749 | A1* | 9/2016 | MacGougan ........... | G01S 19/45 |
| 2017/0248428 | A1* | 8/2017 | Cho ...................... | G01C 21/206 |
| 2018/0003494 | A1* | 1/2018 | Fleming ................ | G01C 5/06 |
| 2018/0003507 | A1* | 1/2018 | Arslan ................... | G01C 21/28 |
| 2018/0073951 | A1* | 3/2018 | Venkatraman ........ | H04W 4/025 |
| 2018/0094998 | A1* | 4/2018 | Youssef ................ | G01L 27/005 |
| 2018/0206078 | A1* | 7/2018 | Venkatraman ........ | H04W 4/025 |
| 2019/0212152 | A1* | 7/2019 | Haverinen ........... | G01C 21/206 |
| 2019/0310343 | A1* | 10/2019 | Solin .................... | G01S 5/0294 |
| 2019/0368884 | A1* | 12/2019 | Majjigi ................. | H04W 4/029 |
| 2020/0049832 | A1* | 2/2020 | Sevak .................... | G01C 5/06 |

FOREIGN PATENT DOCUMENTS

| | | | |
|---|---|---|---|
| CN | 101750050 A | | 6/2010 |
| CN | 102937449 A | | 2/2013 |
| CN | 103118429 A | | 5/2013 |
| CN | 103364785 A | | 10/2013 |
| CN | 103841642 A | | 6/2014 |
| CN | 104049636 A | | 9/2014 |
| CN | 104748722 A | | 7/2015 |
| CN | 105393139 A | | 3/2016 |
| JP | 2007003195 A | * | 1/2007 |
| JP | 2013527907 A | | 7/2013 |
| JP | 2015514969 A | | 5/2015 |
| KR | 20120096819 A | * | 8/2012 |
| KR | 20160081700 A | | 7/2016 |
| WO | WO-2012155000 A2 | * | 11/2012 ............... G01C 5/06 |
| WO | WO-2014109936 A1 | * | 7/2014 ............... G01C 5/06 |
| WO | WO2015131149 A1 | | 9/2015 |

OTHER PUBLICATIONS

Hamid Mohammed Ali et al: "Floor Identification using smartphone barometer sensor for indoor positioning" ISSN: 2277-9655 Scientific Journal Impact Factor: 3.449, pp. 384-391, Feb. 2015.

(56) References Cited

OTHER PUBLICATIONS

Hao Xia et al: "Using Multiple Barometers to Detect the Floor Location of Smart Phones with Built-in Barometric Sensor for Indoor Positioning", Sensors 2015, 15, 7857-7877; doi:10.3390/s150407857, Sep. 10, 2014.
PCT International Search Report and Written Opinion of the International Searching Authority dated May 28, 2018 for corresponding PCT/EP2018/054023.
Korean Notice of Preliminary Rejection for related Korean Application No. 10-2019-7023374 dated Jun. 4, 2020, with English translation.
Japanese Office Action for Japanese Patent Application No. 2019-545943, dated Sep. 15, 2020, with English translation.
Chinese Office Action for Chinese Application No. 201880013695.3 dated Jan. 12, 2021.
India Examination Report for India Patent Application No. 201937032657 dated Jan. 27, 2021.
Japanese Office Action for Japanese Patent Application No. 2019545943, dated Mar. 30, 2021, with English translation.
Korean Notice of Decision to Rejection Amendment for related Korean Application No. 10-2019-7023374 dated Mar. 10, 2021 with English translation.
Korean Notice of Final Rejection for related Korean Application No. 10-2019-7023374 dated Mar. 10, 2021 with English translation.
Chinese Office Action for Chinese Application No. 201880013695.3 dated Jun. 30, 2021.
Korean Notice of Preliminary Rejection for related Korean Application 10-2021-7011062 dated Jul. 5, 2021 with English translation.
Hai-tao Li et al, "Indoor Map Information Based WiFi Positioning Technology for Multi-Floor Buildings," Journal of University of Electronic Science and Technology of China, vol. 46, No. 1, Jan. 31, 2017. (pp. 1-6).
Shuang Qi, "Research on WiFi Fingerprinting Location Technology Based on Mobile Terminal," China Doctoral Dissertations and Master's Thesese Full-Text Database (Master)-Information Technology, No. 3. Mar. 15, 2016. (pp. 1-77).

\* cited by examiner

PRECISE ALTITUDE ESTIMATION FOR INDOOR POSITIONING

FIELD

The following disclosure relates to the field of indoor positioning, or more particularly relates to systems, apparatuses, and methods for determining an estimation information indicative of an altitude.

BACKGROUND

Indoor positioning (i.e. position finding, including floor detection) requires novel systems and solutions that are specifically developed and deployed for this purpose. The 'traditional' positioning technologies, which are mainly used outdoors, e.g. satellite and cellular positioning technologies, generally cannot deliver such performance indoors that would enable seamless and equal navigation experience in both environments. The required positioning accuracy (e.g. 2-3 m), coverage (e.g. ~100%) and floor detection are challenging to achieve indoors with satisfactory performance levels with the systems and signals that were not designed and specified for the indoor use cases. Satellite-based radio navigation signals simply do not penetrate enough through the walls and roofs for adequate signal reception, and the cellular signals usually have too narrow bandwidth for accurate ranging by default.

Several indoor-dedicated solutions have been developed and commercially deployed during the past years, e.g. solutions based on pseudolites (GPS-like short range beacons), ultra-sound positioning, BTLE signals (e.g. High-Accuracy Indoor Positioning, HAIP) and WiFi-Fingerprinting. What is typical to these solutions is that they require either deployment of totally new infrastructure (beacons, tags to name but a few examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, e.g. for health care or dedicated enterprise solutions. Further, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is, being globally scalable, having low maintenance and deployment costs, and offering acceptable end-user experience, the solution should be based on existing infrastructure in the buildings and on existing capabilities in the consumer devices. This leads to the conclusion that the indoor positioning is advantageously based on WiFi- and/or Bluetooth (BT)-technologies that are already supported in every smartphone, tablet, laptop and even in the majority of the feature phones. It is, thus, required to find a solution that uses the WiFi- and BT-radio signals in such a way that makes it possible to achieve e.g. 2-3 m horizontal positioning accuracy, e.g. close to 100% floor detection with the ability to quickly build the global coverage for this approach.

SUMMARY

Floor detection can be based, at least in part, on altitude values, which are known to be estimated by GPS. However, such altitude estimation have very low accuracy (e.g. +−50 m), which is not sufficient for floor detection.

It is thus, inter alia, an object of the disclosure to achieve precise altitude estimation.

According to a first exemplary embodiment of the present disclosure, a method is disclosed, the method comprising:
   determining at least one relative altitude information based, at least in part, on at least one pressure information, wherein the at least one relative altitude information is indicative of a relative value of an altitude;
   determining at least one absolute altitude information associated with a data element of a database comprising map data, wherein the at least one absolute altitude information is indicative of an absolute value of an altitude;
   determining an estimation information based, at least in part, on the determined relative altitude information and, at least in part, on the determined absolute altitude information, wherein the estimation information represents an absolute value of an altitude.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the electronic device.

According to a further exemplary aspect of the disclosure, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the disclosure, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the disclosure may be a module or a component for a device, for example a chip. Alternatively, the disclosed apparatus according to any aspect of the disclosure may be a device, for instance a server or server cloud. The disclosed apparatus according to any aspect of the disclosure may comprise only the disclosed components, for instance means, processor, memory, or may further comprise one or more additional components.

According to a further exemplary aspect of the disclosure, a system is disclosed, comprising: an apparatus according to any aspect of the disclosure as disclosed above, and an electronic device, wherein the electronic device is configured to receive at least one of a determined estimation information.

In the following, exemplary features and exemplary embodiments of all aspects of the present disclosure will be described in further detail.

The pressure information may for instance stem from an entity that is different from the apparatus, e.g. from an electronic device (e.g. a terminal). It may for instance be received from the electronic device, or from another entity. Alternatively, the pressure information may for instance be determined by the apparatus or a component thereof. The pressure may for instance be an atmosphere pressure. The atmosphere pressure may for instance vary according to different parameters such as temperature, humidity, concentrate of gas to name but a few examples. In particular, the temperature effects the atmosphere pressure. In order to obtain an accurate relative altitude information, the pressure information may for instance be additionally indicative of a temperature. The pressure information may alternatively or additionally stem from an entity that is different from the electronic device, e.g. a server or computer. The pressure information may for instance be gathered by at least one sensor, e.g. a pressure sensor—also referred to as barometric sensor. The pressure information may for instance be indicative of a change of pressure. The change of pressure may for instance be obtained by comparing the pressure information obtained at a second time to a pressure information obtained at a first time, wherein the pressure information obtained at the second time is obtained at a later stage than the pressure information obtained at the first time.

Based on the at least one pressure information, the relative altitude information is determined, e.g. by using a processor. The processor may for instance be part of an apparatus, e.g. an electronic device. The relative altitude information may for instance be based on one or more pieces of pressure information. The relative altitude information may for instance represent altitude changes, but not absolute altitude values.

The electronic device may for instance be portable (e.g. weigh less than 5, 3, 2, or 1 kg). The electronic device may for instance be at least temporarily (e.g. in removable form) or permanently installed in a vehicle. The vehicle may for instance be a car, a truck, a motorcycle, a bicycle, a boat or a plane, to name but a few examples. The electronic device may for instance comprise or be connectable to a display for displaying a route that is guided/navigated to a user. The electronic device may for instance comprise or be connectable to means for outputting sound, e.g. in the form of spoken commands or information. The electronic device may for instance comprise or be connectable to one or more sensors for determining the devices position, such as for instance a Global Navigation Satellite System (GNSS) receiver, e.g. in the form of a Global Positioning System (GPS) receiver. The electronic device may for instance comprise or be connectable to one or more sensors for determining the at least one pressure information, e.g. in the form of a barometric sensor. The electronic device may for instance be suitable for outdoor and for indoor navigation respectively positioning or for indoor navigation respectively positioning.

One or more data elements of the database comprising map data are available, e.g. to the electronic device. The data elements may for instance represent map regions. These map regions may for instance be parts of a larger map. These parts of the larger map may for instance pertain to different geographic regions, e.g. different geometric regions into which a map has been divided, e.g. by a grid. One or more data elements of the database may for instance comprise building boundaries. Inside the building boundaries, indoor navigation may be used.

The data elements are for instance available, e.g. to the electronic device, by being stored in or at the electronic device, or by being accessible by the electronic device, e.g. via a wireless or wire-bound connection e.g. to an apparatus that stores the data elements. This apparatus may be remote from the electronic device or may be included with the electronic device into one device.

The absolute altitude information is indicative of an absolute value of an altitude. The absolute altitude information is associated with the data element of the database comprising map data, e.g. representing a map region. The absolute altitude information may for instance be determined by obtaining (e.g. receiving) an absolute altitude value, e.g. from map data. The absolute altitude value may for instance be obtained from another entity, e.g. a server. The absolute altitude information may for instance be determined based on a position information. The position information may for instance be indicative of a horizontal location, e.g. of an electronic device. The position information may for instance be indicative of a horizontal location (e.g. of an electronic device) outside of a building. The position information may for instance not be indicative of an absolute altitude value. The position information may for instance be provided from a GNSS, e.g. GPS, Galileo, Globalnaja nawigazionnaja sputnikowaja sistema (GLONASS) to name but a few examples. The position information may for instance be determined based at least on one signal receivable from a GNSS, e.g. a GPS horizontal location. The absolute altitude information may for instance be determined based on a position information and the absolute altitude information associated with the data element, e.g. the data element representing a map region, in which the position information is located. For instance, a position information is indicative of a horizontal location of an electronic device, but not of an absolute altitude value of the location of the electronic device. Based on the position information, the absolute altitude value at the horizontal location according to the position information can be determined. The absolute value of the location may for instance be determined by using the position information indicative of the horizontal location (of the electronic device) to determine the absolute altitude value by using the position information to obtain the absolute altitude value e.g. from an altitude map. The altitude map may for instance comprise at least one absolute altitude values associated with a position information, e.g. horizontal location (e.g. latitude and longitude coordinates).

Absolute altitude information associated with the data elements representing a map region and/or absolute altitude information associated with data elements representing adjacent map regions do not change steeply in general. Thus, even if the position information is not accurate in relation to the correct location, an error of tens of meters according to the position information may only result in minor error (e.g. a few meters or less) in altitude. The determined absolute altitude information associated with the data element is very precise compared to an altitude value provided by a GNSS, e.g. GPS.

The estimation information represents an absolute value of an altitude, and is determined based, at least in part, on the determined relative altitude information and, at least in part, on the determined absolute altitude information. The estimation information is determined for instance after the absolute altitude information is determined. The relative altitude information may for instance be indicative of altitude changes for continuing altitude estimation after a (e.g. direct) determining of the absolute altitude information becomes unavailable or the absolute altitude information becomes ambiguous, e.g. because the current position is inside a building or inside other multilayer constructions. The estimation information may for instance be determined by a calibration of the relative altitude information by considering the absolute altitude information. Thus, the relative altitude information may for instance indicate an altitude change only. By calibrating the relative altitude information, a very precise altitude is determined, which is represented by the determined estimation information.

Additionally or alternatively, if it is impossible to detect whether the position is inside a building or not (e.g. there is no information about building boundaries available and an absolute altitude information still can be determined), it may for instance be checked, whether the relative altitude information diverges rapidly from the absolute altitude information or not. For instance, if a movement upstairs inside a building takes place, the absolute altitude information will remain the same or change minimally since the position information, e.g. being indicative of a horizontal position, remains the same. Thus, during a movement upstairs inside a building, the horizontal location does not change much. However, during a movement upstairs inside a building, the relative altitude information will indicate a rapid change in altitude. In this case, it is likely that the current position is inside a building (or multilayer construction). The estimation information may be based primarily on the relative altitude information, since the relative altitude information is more accurate in this scenario. For a calibration of the estimation information, the determined estimation information may be based on the (e.g. last) determined absolute altitude information.

The estimation information may for instance be outputted, e.g. to an electronic device or to another apparatus that transfers the estimation information to an electronic device. At the electronic device that received the outputted estimation information, the outputted estimation information may for instance be used for indoor navigation and/or positioning purposes.

Example embodiments thus make it possible to accurately determine an estimation information representing an altitude (e.g. of an electronic device) for usage in indoor navigation systems, in particular using the determined estimation information for determining a floor level inside a building, e.g. indoor navigation respectively positioning.

It should be noted that the step of obtaining the pressure information and the step of determining the relative altitude information can take place in parallel. For instance, before determining the estimation information, the pressure information and the relative altitude information may be determined. After determining the relative and the absolute altitude information, the estimation information may for instance be determined.

According to an exemplary embodiment of all aspects of the present disclosure, the method further comprises:
obtaining a position information, wherein the absolute altitude information is determined based, at least in part, on the position information.

The position information may for instance be indicative of a horizontal location of an electronic device. The position information may for instance be indicative of a horizontal location outside of a building.

The position information may for instance be provided from a GNSS module, e.g. GPS, Galileo, GLONASS module, to name but a few examples. The GNSS module may for instance be part of the apparatus (e.g. electronic device). The position information may for instance be determined based at least on one signal receivable from a GNSS. The position information may for instance be received from an entity, e.g. a server, a server cloud or a computer. Alternatively, the position information is caused receiving from an entity, e.g. by sending a request for obtaining the position information to the entity. Upon reception of the request for obtaining the position information, the entity may for instance return the position information, which is received by the originator of the request.

The absolute altitude information is determined based, at least in part, on the position information (or a part thereof). In an exemplary embodiment according to the first aspect, the absolute altitude information may for instance be determined based on the position information.

For instance, the absolute altitude information may be derived from an altitude map. The altitude map may for instance comprise at least one absolute altitude information associated with the altitude at a horizontal location or at an area of a plurality of horizontal locations. Based on the position information, the absolute altitude information may for instance be obtained from the altitude map. In general, the value of the altitude at adjacent horizontal locations does not change steeply. Thus, even if the position information is erroneous with respect to the horizontal location (e.g. error of tens of meters) may for instance result only in a few meter error in the value of the altitude compared to the non-erroneous position information.

According to an exemplary embodiment of all aspects, the estimation information is determined by mapping (e.g. fixing, combining, or integrating) the relative altitude information onto the absolute altitude information. Additionally or alternatively, the relative altitude information is mapped onto initially determined estimation information. For instance, after the determining of an initial estimation information (e.g. performing the method according to the first aspect once), further determined relative altitude information (e.g. determined based on one or more pressure information, e.g. obtained from a barometric sensor) may for instance be used to track altitude changes. One scenario for tracking altitude changes based on further determined relative altitude information may be in order to continue to determine estimation information after obtaining a position information by a GNSS, which becomes unavailable. Another scenario for tracking altitude changes based on further determined relative altitude information may be after the determined absolute altitude information, e.g. associated with a data element of map data representing an altitude map becomes ambiguous (e.g. current position is inside a building or inside other multilayer constructions).

In an exemplary embodiment of all aspects of the present disclosure, the last known or last determined absolute altitude information is used for mapping the relative altitude information onto the absolute altitude information. At least one change in altitude may for instance be mapped onto the last known or last determined absolute altitude information. Alternatively, a first determined absolute altitude information may for instance be used for mapping the relative altitude information onto the absolute altitude information. In this way, the relative altitude information is set in relation to the absolute altitude information representing a very accurate altitude.

The last known or last determined absolute altitude information may for instance be determined before a position information (e.g. determined via a GNSS) becomes unavailable.

According to an exemplary embodiment of all aspects of the present disclosure, the determining of the relative altitude information is performed and/or controlled even if a position information (e.g. determined via a GNSS) is receivable. In this way, a plurality of pieces of relative altitude information may be determined even in outdoor navigation and/or positioning scenarios to filter a determined position information (e.g. a horizontal location), or at least one absolute altitude information, e.g. determined based on the position information and map data (e.g. representing an altitude map) based on the plurality of pieces of relative altitude information.

In an exemplary embodiment according to all aspects, the map data represents an altitude map.

An altitude map may for instance be a terrain elevation map, also referred to as topographic map. The altitude map may for instance consist of one or more data elements associated with absolute altitude information. For instance, different regions into which a map has been divided are associated with an absolute altitude information, wherein the absolute altitude information is indicative of an absolute altitude. One or more absolute altitude information may for instance be associated with a data element. In case a map has been divided into one or more regions, one or more absolute altitude information may for instance be associated with one region. In case, only one absolute altitude information is associated with one region, the absolute altitude information may represent the median altitude of the region. The absolute altitude information may for instance comprise the altitude in the unit of meters or feet, e.g. meters or feet above sea level.

The altitude map may for instance be generated based on crowd-sourced (e.g. harvested) estimation information, e.g. with respect to a position information (e.g. a horizontal location). One or more estimation information may for instance be aggregated into an altitude map. The altitude map may for instance represent a map region. The altitude map may for instance represent a map region around (e.g. within the vicinity) of a building. The altitude map may for instance represent a map region around (e.g. within the vicinity) of a building comprising boundaries of the building.

According to an exemplary embodiment of all aspects, a plurality of estimation information are determined. For instance, the plurality of estimation information may consist of estimation information, wherein each estimation information is determined consecutively (e.g. in consecutive time intervals). The estimation information may for instance be associated with at least one position information. In case the estimation information is associated with a plurality of position information, the plurality of position information may for instance represent a track along which a user (e.g. an electronic device of the user) has moved.

In an exemplary embodiment according to all aspects, the plurality of estimation information are filtered.

The filtering may for instance be based on a combination of at least one position information (e.g. determined via a GNSS) and the map data (e.g. map data representing an altitude map).

In an exemplary embodiment according to all aspects, the method comprises:
  determining at least two pieces of absolute altitude information;
  checking or causing checking whether or not the at least two pieces of absolute altitude information differ from each other;
  obtaining a transformation function for adjusting the at least two pieces of absolute altitude information to each other.

The at least two absolute altitude information are associated with data elements of the database comprising map data. The map data may for instance represent an altitude map. In case the at least two determined absolute altitude information differ from each other, two sets of map data (e.g. map data representing an altitude map respectively) may be associated with different absolute altitude values. In order to obtain the most likely and accurate absolute altitude value, e.g. for the position information, it may for instance be checked or caused to be checked, whether a transformation function between the two sets of map data (e.g. map data representing an altitude map respectively) is available or not. The checking may for instance be performed and/or controlled by an apparatus performing and/or controlling the method according to the first aspect. The causing to be checked may for instance be performed and/or controlled by an entity that is different from an apparatus performing and/or controlling the method according to the first aspect.

Alternatively, the at least two absolute altitude information associated with data elements of the database comprising map data (e.g. map data representing an altitude map respectively), which may be associated with different absolute altitude values, may for instance be checked or caused to be checked, whether or not a difference between the least two absolute altitude information associated with data elements of the database comprising map data matches the determined at least one relative altitude information. In case, the difference between the least two absolute altitude information associated with data elements of the database comprising map data does not match the determined at least one relative altitude information, the at least two absolute altitude information associated with data elements of the database comprising map data may for instance be corrected based, at least in part, on the determined relative altitude information. This may for instance be performed by using a Kalman filter, e.g. as disclosed in this specification of the present disclosure, wherein the aforementioned correction of the at least two absolute altitude information associated with data elements of the database comprising map data may be performed by a respective dynamic model (e.g. state-transition model) of the Kalman filter.

According to an exemplary embodiment of all aspects, determining the estimation information comprises filtering one or more absolute altitude information by using a Kalman filter. Additionally, determining the estimation information may comprise filtering one or more relative altitude information by using the Kalman filter. The estimation information may for instance be determined by using the Kalman filter.

The Kalman filter may for instance be any kind (e.g. method) of signal processing that utilizes a dynamic model propagated by calculating an innovation, wherein the innovation is the difference between an input information and an information, which is estimated, produced by the dynamic model. For instance, the Kalman filter determines an output signal (e.g. the estimation information) from present and past values of an input signal (e.g. the absolute altitude information and/or the relative altitude information). One or more absolute altitude information may for instance be used as an input signal of the Kalman filter. Additionally, the relative absolute information may for instance be used to determine and/or define the dynamic model (e.g. a state transition model) of the Kalman filter in order to determine the estimation information. In such a way, the estimation information is accurate with respect to the absolute altitude information, e.g. associated with the data element of the database comprising map data, in particular representing the altitude map.

According to an exemplary embodiment of all aspects, a dynamic model of the Kalman filter is determined and/or defined based, at least in part, on the relative altitude information. Additionally, the dynamic model of the Kalman filter may be determined and/or defined based, at least in part, on the pressure information.

In an exemplary embodiment according to all aspects of the present disclosure, at least one data element of the map data comprises an altitude value relative to a pre-defined (e.g. main) floor of a building and/or an altitude value relative to sea level. The map data may comprise one or more relative altitude values. Additionally, the map data may comprise one or more absolute altitude values. In case the map data represents an altitude map, the altitude map may for instance comprise one or more relative altitude values. Additionally, in case the map data represents an altitude map, the altitude map may comprise one or more absolute altitude values. The one or more relative altitude values comprised by the map data (e.g. the map data representing an altitude map) have altitude values relative to a main floor of a building. In such a case, the estimation information is determined with respect to the main floor of the building. Alternatively or additionally, the one or more relative altitude values comprised by the map data (e.g. the map data representing an altitude map) have altitude values relative to sea level. In this case, the estimation information is determined with respect to sea level.

According to an exemplary embodiment of all aspects, the method comprises:
determining a change from at least one signal from a GNSS being receivable to no signal from the GNSS being receivable.

Based on the signal receivable from the GNSS, for instance the position information may be determinable. In case a change from change from at least one signal from the GNSS being receivable to no signal from the GNSS being receivable is determined, the change may for instance be indicative of an indoor navigation respectively positioning scenario. In case change from no signal from the GNSS being receivable to at least one signal from the GNSS being receivable is determined, the change may for instance be indicative of an outdoor navigation respectively positioning scenario. In an exemplary embodiment according to all aspects in which the indoor navigation respectively positioning scenario applies, the estimation information may be determined. Alternatively or additionally, in an exemplary embodiment according to all aspects in which the outdoor navigation respectively positioning scenario applies, the estimation information may be determined as well. In this way, for instance accurate radio maps for e.g. floor-level localization accuracy can be generated. In this radio map, accurate altitude represented by the estimation information of radio nodes within meter or even sub-meter (alternatively: feet or inch) can be achieved.

In an exemplary embodiment according to all aspects of the present disclosure, the method comprises:
using estimation information for propagation in response to receiving an altitude estimation request.

For instance, the determined estimation information may be sent to an entity from which the altitude estimation request is received. Additionally or alternatively, the determined estimation information may be caused sending to an entity from which the altitude estimation request is received.

In this way, the absolute altitude information (e.g. obtained from data elements of the database comprising map data (e.g. altitude map)) is used to correct the relative altitude information to get very precise altitude estimation represented by the estimation information. For instance, there is no need for a kind of calibration of a pressure sensor in order to achieve precise altitude estimation.

It is to be understood that the presentation of the disclosure in this section is merely by way of examples and non-limiting.

Other features of the disclosure will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show.

DETAILED DESCRIPTION

The following description serves to deepen the understanding of the present disclosure and shall be understood to complement and be read together with the description as provided in the above summary section of this specification.

Figure 1:
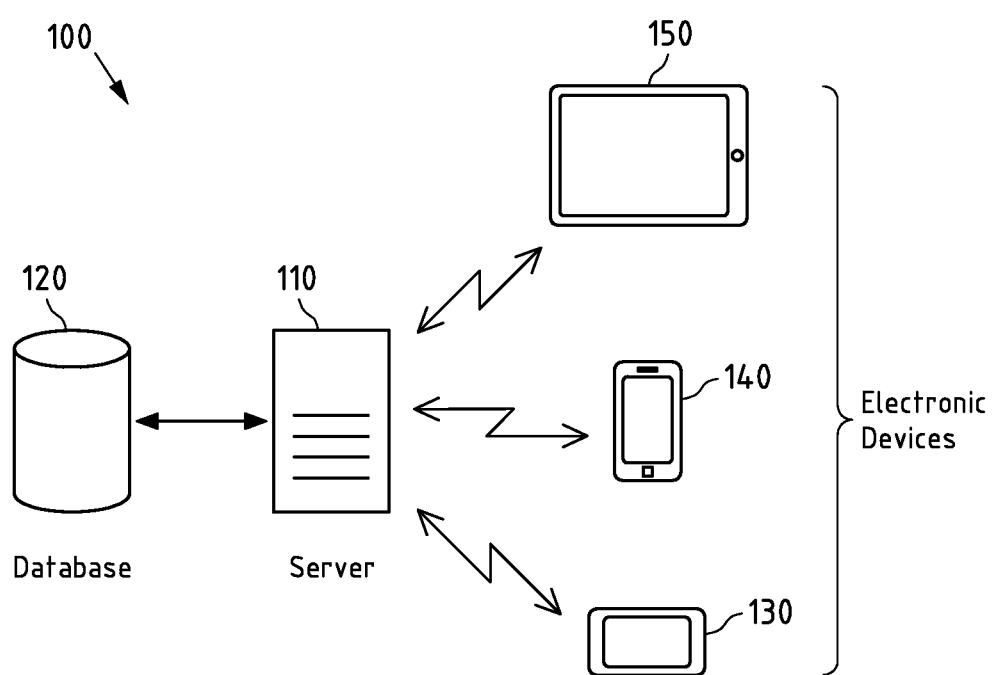
FIG. 1 a schematic block diagram of a system according to an exemplary aspect of the present disclosure.

FIG. 1 is a schematic block diagram of a system according to an exemplary embodiment of the present disclosure. System 100 comprises a server 110, which may alternatively be embodied as a server cloud (e.g. a plurality of servers connected e.g. via the internet and providing serves at least partially jointly), a database 120, which may be connected to the server e.g. via the internet and allowing access from the server 110 to data of the database 120, alternatively the database 120 may be embodied e.g. in the server 110, and an electronic device, of which three different realizations are shown as non-limiting examples: a portable navigation device 130, a mobile device 140 and a tablet 150. The electronic device may for instance be a fingerprint collection device that collects at least one radio fingerprint (data including a set of one or more radio beacon identifiers of respective radio beacons that can be "heard" (e.g. received with a pre-determined quality and/or signal level or signal-to-noise level or signal-to-noise-and-interference level) at the current position of the electronic device; an estimate (e.g. a GNSS estimate) of the current position of the electronic device; and for instance further a set of respective received signal strengths indicators pertaining to the set of one or more radio beacon identifiers) and provides it to server 110 to enable server 110 to estimate, at least based on the radio fingerprint (and for instance further radio fingerprints provided by the electronic device and/or further electronic devices) one or more radiomaps that may be used for positioning and/or navigation purposes by other electronic devices, According to an example embodiment, electronic device 130, 140, 150 may store map data, e.g. provided by server 110. Communication, e.g. for the transmission of the map data, between server 110 and electronic device 130, 140, 150 may for instance take place at least partially in a wireless function, e.g. based on cellular radio communication or on Wireless Local Area Network (WLAN) based communication, to name but a few examples. Map data may comprise at least one data element. Map data may for instance represent at least one altitude map, e.g. a map region associated with at least one altitude information. Further, map data may comprise an absolute altitude information, e.g. an altitude value. The absolute altitude information may for instance be associated with the data element. Additionally, map data may for instance comprise at least one altitude value relative to a main floor of a building and/or at least one altitude value relative to sea level. Each of the altitude values relative to a main floor of a building and/or relative to sea level may for instance be associated with the data element. Map data may for instance comprise one or more building boundaries. At least one absolute altitude value may for instance be associated with a data element outside of the one or more building boundaries.

The electronic device may be configured to receive at least one data element. At least one data element and/or map data may be stored in database 120, and may be provided to electronic device 130, 140, 150 via server 110. In this way, e.g. an absolute altitude information associated with a data element may be determined, for instance as a service, to electronic device(s) of user(s).

Figure 2:
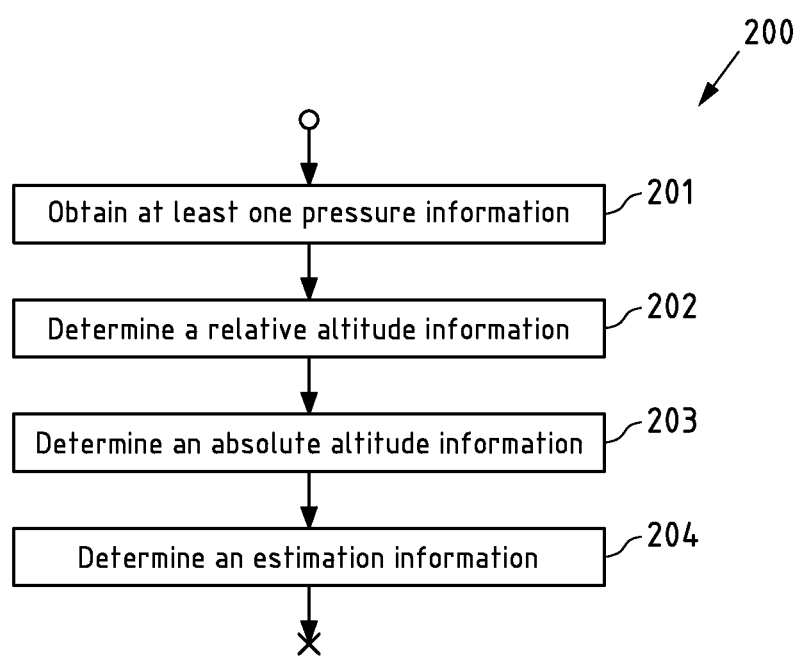
FIG. 2 a flowchart showing an example embodiment of a method according to the first exemplary aspect of the present disclosure.

According to an alternative example embodiment, electronic device 130, 140, 150 may obtain at least one pressure information, e.g. gathered by a pressure sensor of the electronic device 130, 140, 150. The obtained pressure information may then be provided to server 110 by electronic device 130, 140, 150 (e.g. together with further fingerprint measurements). Upon receiving the obtained pressure information, server 110 may perform the method according to the first aspect of the present disclosure. In this way, based on an obtained pressure information from an electronic device 130, 140, 150, the server 110 may determine an estimation information. Additionally, the determined estimation information may be outputted (e.g. provided) to the electronic device 130, 140, 150 from the server 110. FIG. 2 is a flowchart 200 showing an example embodiment of a method according to the first exemplary aspect of the present disclosure. This flowchart 200 may for instance be performed by server 110 of FIG. 1, or by electronic device 130, 140, 150 of FIG. 1.

In optional step 201, at least one pressure information is obtained (e.g. received), e.g. from electronic device 130, 140, 150 of FIG. 1 or from another entity. Alternatively, at least one pressure information is obtained (e.g. gathered), e.g. by a sensor, in particular a sensor of the electronic device 130, 140, 150. The sensor may for instance be a pressure sensor, e.g. a barometric sensor. The pressure sensor may for instance be used to obtain at least one pressure information. The pressure information may for instance represent a tracking of atmosphere pressure changes.

Based on the at least one pressure information, a relative altitude information is determined in step 202. The at least one pressure information may for instance represent a pressure measurement (e.g. by a barometric sensor), which is indicative of at least one atmosphere pressure change. The at least one relative altitude information may for instance be indicative of at least one altitude change, but not indicative of an absolute altitude value.

In step 203, an absolute altitude information is determined. The absolute altitude information is associated with a data element of a database comprising map data. The absolute altitude information is indicative of an absolute value of an altitude. The absolute altitude information may for instance be determined by obtaining a position (e.g. horizontal location) e.g. obtained by using a location service of a GNSS, and using the determined position information to obtain the absolute altitude information, e.g. from an altitude map. In case, an altitude map does not exist, the absolute altitude information may for instance be determined based on e.g. crowd-sourced absolute altitude values. These crowd-sourced altitude values may for instance be associated with certain position. E.g. the absolute altitude information is associated with a data element of a database comprising map data. The map data may represent an altitude map. The absolute altitude information is obtained, e.g. received from a database, in which at least one absolute altitude information is stored.

Based, at least in part, on the determined relative altitude information and, at least in part, on the absolute altitude information, an estimation information is determined in step 204. For instance, the determined relative altitude information is mapped onto the absolute altitude information. In this way, the relative altitude information (e.g. representing at least one altitude change) is fixed corresponding to the absolute altitude information. In this way, an absolute altitude can be determined even if an absolute altitude information cannot be determined directly (e.g. indoors), e.g. from an altitude map based on a horizontal location (e.g. outdoors). The estimation information represents an absolute value of an altitude.

Figure 3:
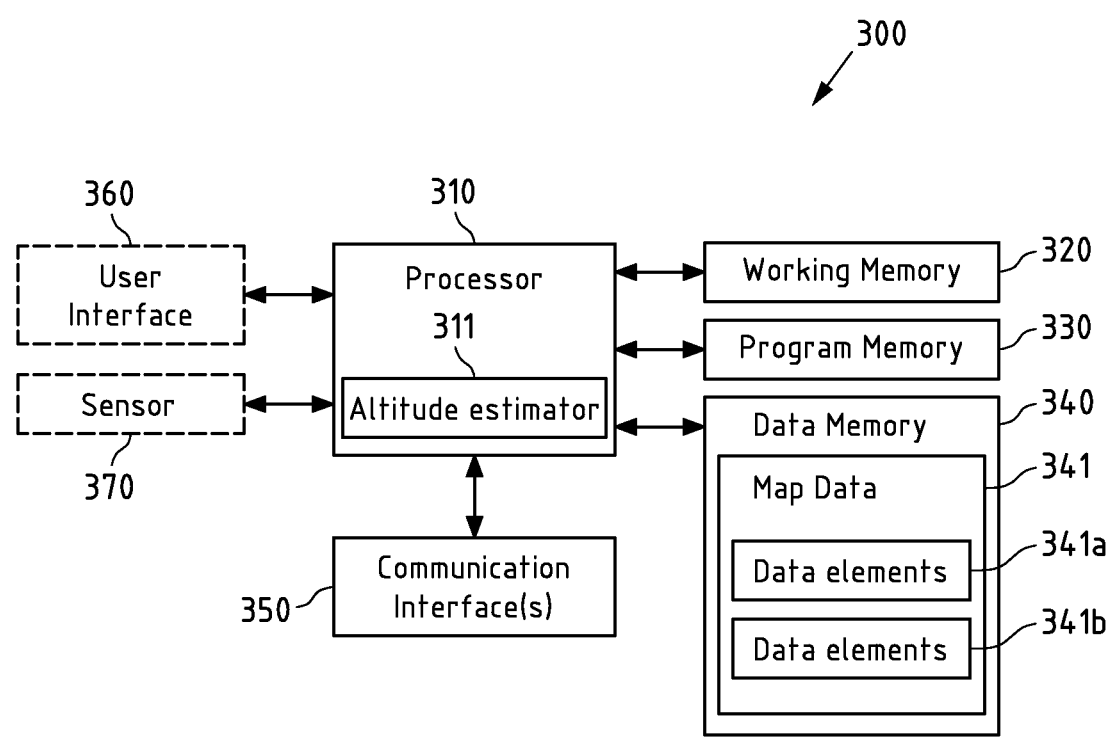
FIG. 3 a schematic block diagram of an apparatus according to an exemplary aspect of the present disclosure.

FIG. 3 is a schematic block diagram of an apparatus 300 according to an exemplary aspect of the present disclosure, which may for instance represent the electronic device 130, 140, and/or 150 of FIG. 1. Alternatively, the schematic block diagram of the apparatus 300 according to an exemplary aspect of the present disclosure may for instance represent server 110 of FIG. 1.

Apparatus 300 comprises a processor 310, working memory 320, program memory 330, data memory 340, communication interface(s) 350, an optional user interface 360 and an optional sensor 370.

Apparatus 300 may for instance be configured to perform and/or control or comprise respective means (at least one of 310 to 370) for performing and/or controlling the method according to the first exemplary aspect. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control the method according to exemplary aspects of the disclosure.

Processor 310 may for instance comprise an altitude estimator 311 as a functional and/or structural unit. Altitude estimator 311 may for instance be configured to determine an estimation information (see step 204 of FIG. 2). Processor 310 may for instance further control the memories 320 to 340, the communication interface(s) 350, the optional user interface 360 and the optional sensor 370.

Processor 310 may for instance execute computer program code stored in program memory 330, which may for instance represent a computer readable storage medium comprising program code that, when executed by processor 310, causes the processor 310 to perform the method according to the first exemplary aspect.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 330 may also be included into processor 310. This memory may for instance be fixedly connected to processor 310, or be at least partially removable from processor 310, for instance in the form of a memory card or stick. Program memory 330 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 330 may also comprise an operating system for processor 310. Program memory 330 may also comprise a firmware for apparatus 300.

Apparatus 300 comprises a working memory 320, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store map data 341. Map data 341 may for instance represent an altitude map. Map data 341 may comprise one or more data elements, e.g. data elements 341a and 341b. Each data element stored in data memory 340 may for instance represent at least one map region. Further, an absolute altitude information may be associated with each of the data elements. Further, each at least one map region of a data element may border to another at least one map region of a further data element.

Communication interface(s) 350 enable apparatus 300 to communicate with other entities, e.g. with server 110 of FIG. 1. The communication interface(s) 350 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 300 to communicate with other entities, for instance with server 110 of FIG. 1.

User interface 360 is optional and may comprise a display for displaying information to a user and/or an input device (e.g. a keyboard, keypad, touchpad, mouse, etc.) for receiving information from a user.

Sensor 370 is optional and may for instance comprise a barometric sensor, e.g. to gather pressure information.

Some or all of the components of the apparatus 300 may for instance be connected via a bus. Some or all of the components of the apparatus 300 may for instance be combined into one or more modules.

Figure 4:
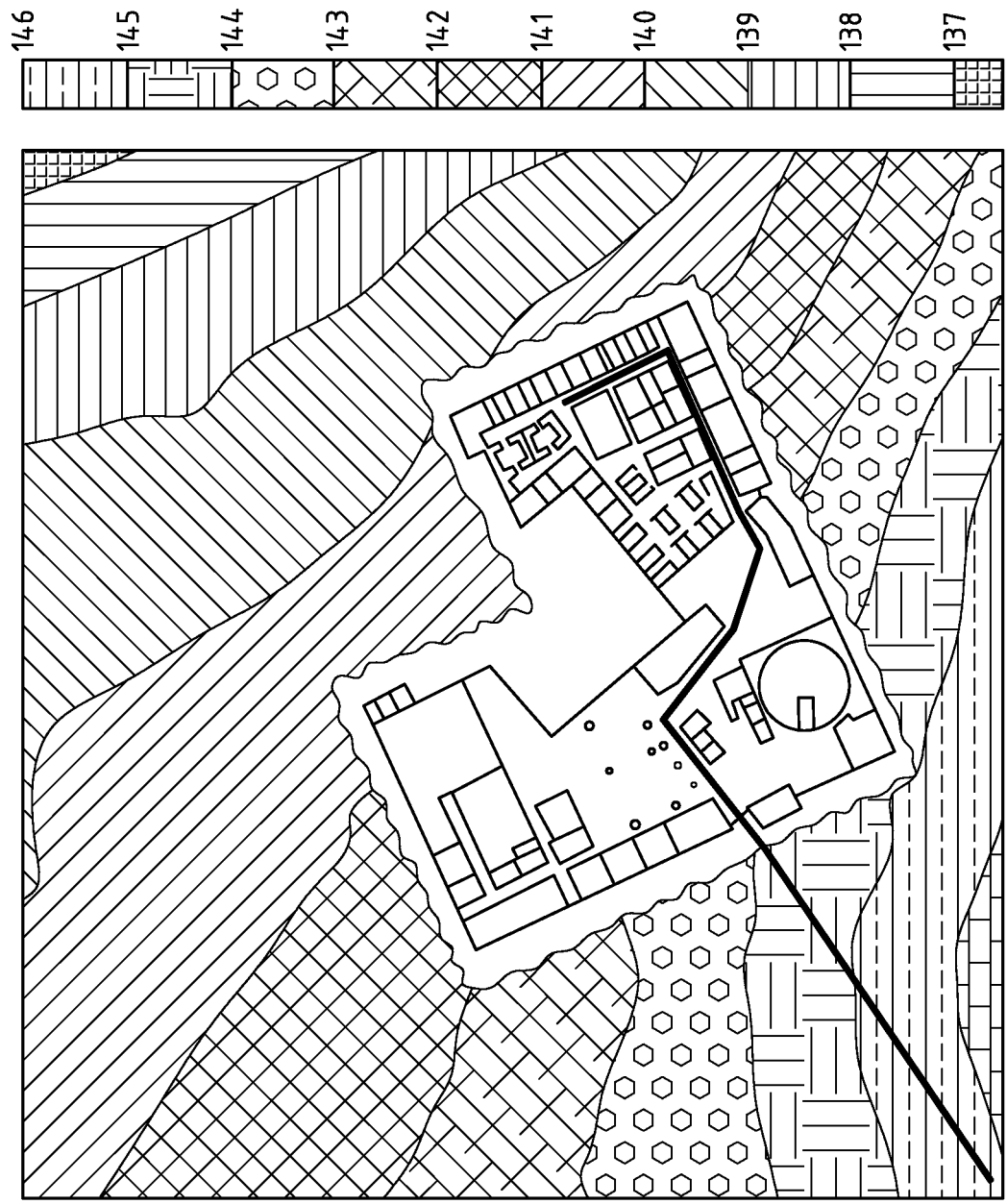
FIG. 4 a schematic example altitude map of an exemplary embodiment of a method according to the first aspect of the present disclosure.

FIG. 4 shows a schematic example of an altitude map, which may be used for determining an absolute altitude information according to an exemplary embodiment of a method according to the first aspect of the present disclosure.

Map data may for instance represent the altitude map. The altitude map shown in FIG. 4 represents a map region. A building comprising building boundaries is located in the altitude map. The altitude map comprises absolute altitude information outside of the boundaries of the building, wherein each of the plurality of absolute altitude information shown in FIG. 4 is indicative of an absolute value of an altitude. Absolute altitude information are presented around the building.

An exemplary position, e.g. horizontal location of an electronic device, in particular a plurality of horizontal positions forming a track, is shown in the altitude map by the continuous line. The altitude changes along the continuous line as the respective horizontal position changes, indicated by each of the different hatched areas, which are traversed represented by the continuous line. For instance, the altitude of the continuous line in the lower left corner of FIG. 4 is presently around 146 meters, and following the continuous line changes to around 145 meters and so forth. The absolute altitude of each horizontal position can be obtained based on the absolute altitude information associated with the region, in which the position is located.

According to an exemplary embodiment of a method of the first aspect, an absolute altitude information associated with a data element comprising map data is determined. As shown in FIG. 4, the map data represents an altitude map.

In the following, an exemplary scenario is described. A user in possession of an electronic device, e.g. electronic device 130, 140, 150 of FIG. 1, may for instance approach the building, shown in FIG. 4 thereby crossing the front yard of the building whose altitude is between 143 meters to 145 meters, as is for instance shown in the altitude map according to FIG. 4. Then the user may for instance enter the building and move to the second floor of the building (one floor above ground level), whose altitude is about 148.6 meters, as can be seen in FIG. 4 from the continuous line of the track of the user.

Figure 5A:
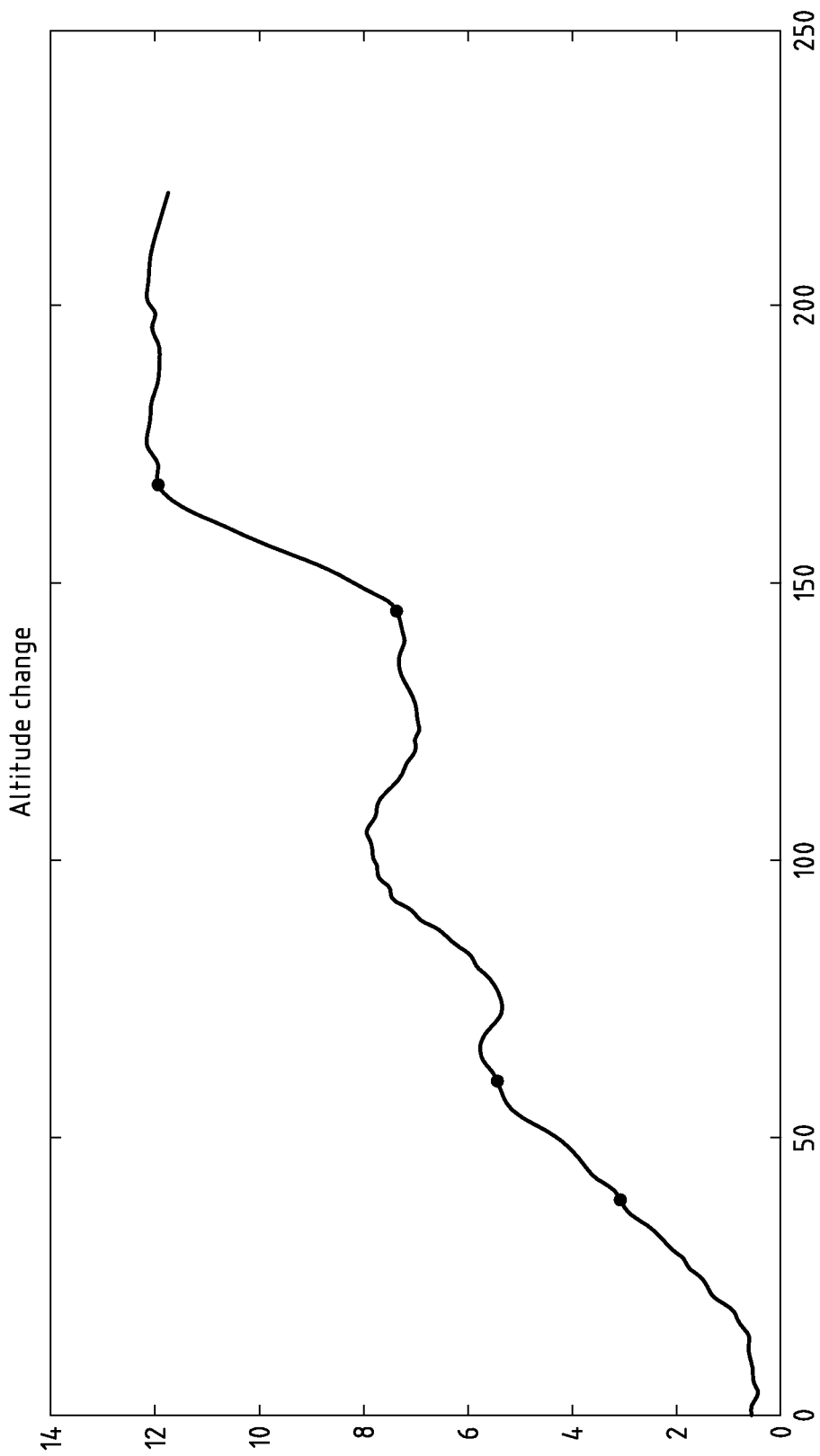
FIG. 5a a schematic diagram of a plotted relative altitude information used in an exemplary embodiment of a method according to the first aspect of the present disclosure.

FIG. 5a shows a schematic diagram of a plotted relative altitude information used in an exemplary embodiment of a method according to the first aspect of the present disclosure.

The relative altitude information may for instance be determined based on at least one pressure information, e.g. obtained (e.g. gathered) by a barometric sensor. FIG. 5a shows that the plotted relative altitude information comprises altitude changes, which are relative. Thus, the relative altitude information represent the change of at least one pressure information compared to another at least one pressure information obtained at an earlier point in time.

Figure 5B:
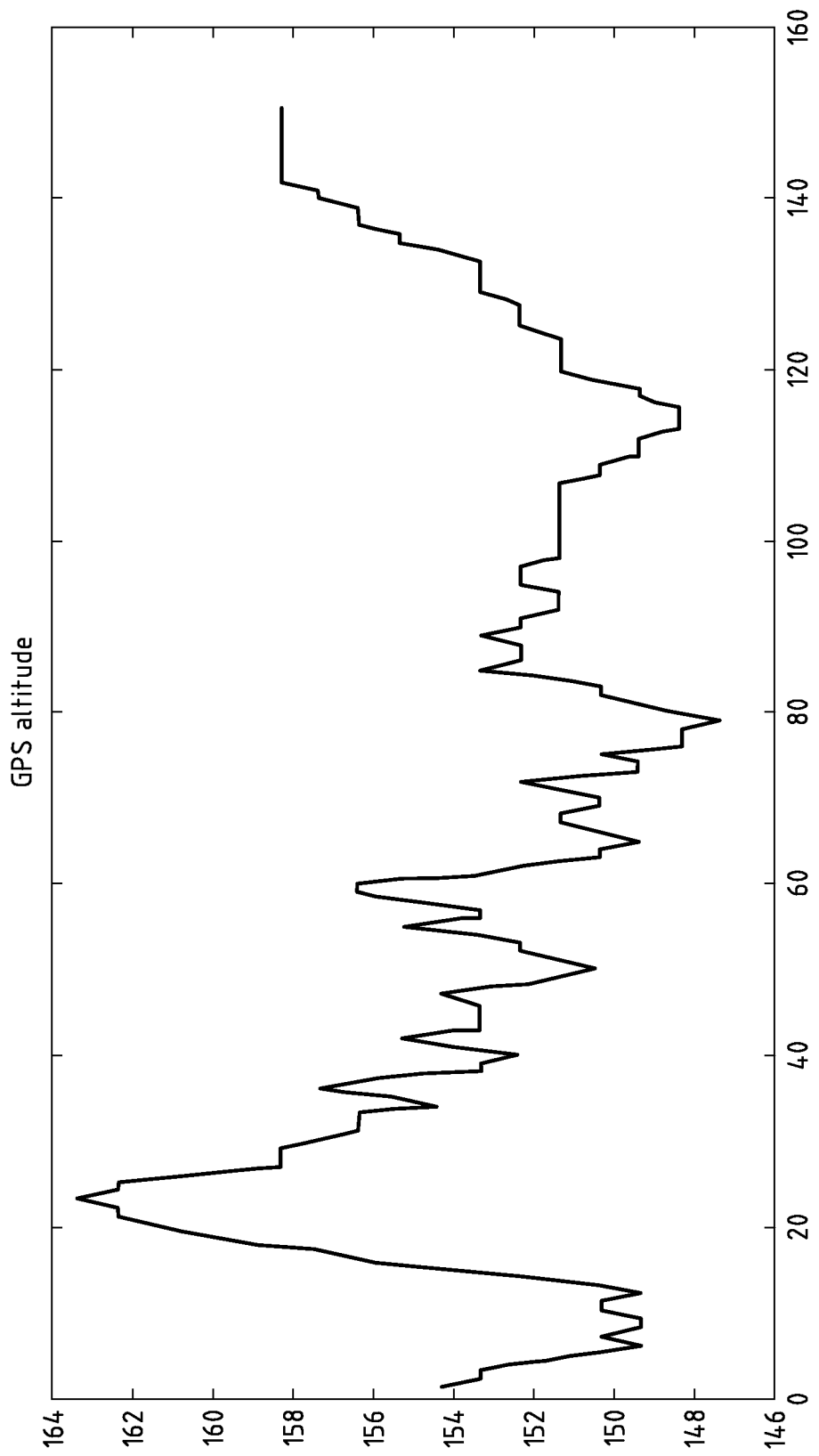
FIG. 5b a schematic diagram of a plotted absolute altitude information provided by a GNSS.

FIG. 5b shows a schematic diagram of a plotted absolute altitude information provided by a GNSS.

The absolute altitude information shown in FIG. 5b are provided by a GNSS, e.g. a GPS. In comparison to the relative altitude information shown in FIG. 5a, the absolute altitude information provided by the GNSS are very different and vary relatively much compared to the relative altitude information shown in FIG. 5a. The difference can be explained due to poor GNSS positioning accuracy.

Figure 5C:
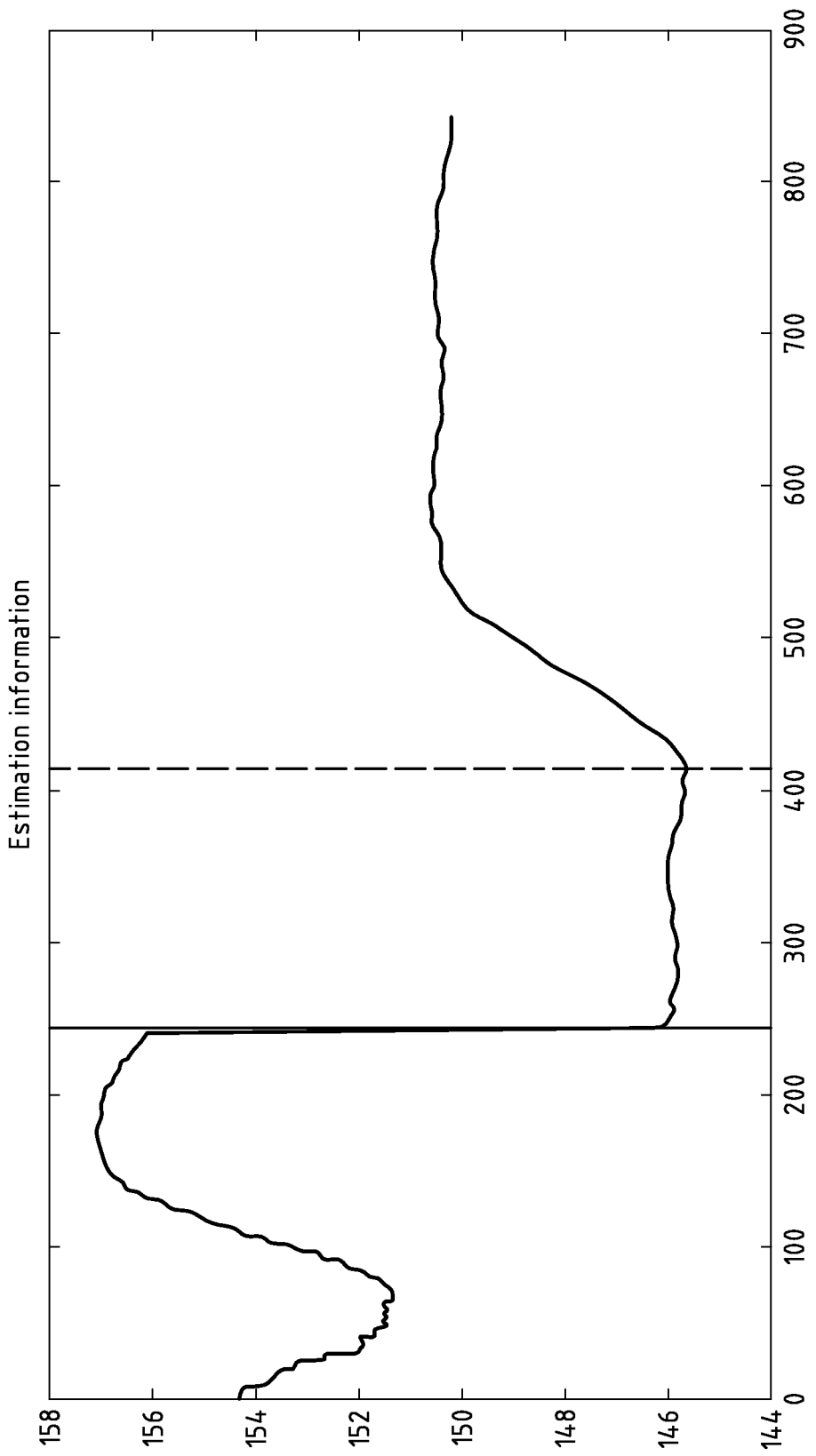
FIG. 5c a schematic diagram of a plotted estimation information used in an exemplary embodiment of a method according to the first aspect of the present disclosure.

FIG. 5c shows a schematic diagram of a plotted estimation information of used in exemplary embodiment of a method according to the first aspect of the present disclosure. The plotted estimation information is determined based, at least in part, on determined relative altitude information and, at least in part, on determined absolute altitude information. The plotted estimation information is thus based on a combination of a obtained position, e.g. a GNSS (horizontal) location, an absolute altitude information associated with a data element of a database comprising map data, e.g. an altitude map, and a relative altitude information, e.g. determined based on an obtained pressure information (e.g. by a barometric sensor).

In the beginning of the plot of FIG. 5c, absolute altitude information is not available. The estimation information is thus based on GNSS altitude estimates, and is filtered based on a pressure information, e.g. barometric measurements by a barometric sensor.

The left vertical line indicates that absolute altitude information associated with a data element of a database comprising map data, e.g. an altitude map, becomes available. In this case, the estimation information is fixed to correct values corresponding to the determined absolute altitude information. Further, the estimation information is filtered and propagated based on barometric measurements.

The right vertical line in FIG. 5c indicates that absolute altitude information associated with a data element of a database comprising map data, e.g. an altitude map, becomes ambiguous. This may for instance happen by the user entering a building. Thus, no GNSS signal, which may be used for GNSS altitude estimates, can be received by the electronic device of the user. The plotted estimation information is based on a relative altitude information, which is based, at least in part, on at least one obtained pressure information.

In an exemplary embodiment according to all aspects of the present disclosure, instead of trying to measure altitude directly from with a GNSS sensor, a horizontal location estimate provided by a GNSS sensor or other source of accurate location data is utilized, and the horizontal location is used to obtain altitude from an altitude map (if such altitude map exists). Altitude map can only be used when horizontal location is outside of a building, for instance on the street, since only in that case horizontal location can be unambiguously mapped to altitude using altitude map. In addition to such altitude fixes, barometer is used to track altitude changes, and propagate estimation further to places where for instance a GPS is not available, or information from the altitude map is ambiguous, for instance in indoor spaces.

The following embodiments shall also be considered to be disclosed:

Embodiment 1

An apparatus comprising at least one processor and at least one memory including computer program code; the at least one memory and the computer program code configured to, with the at least one processor, cause the apparatus to at least perform:
  determining at least one relative altitude information based, at least in, part on at least one pressure information, wherein the at least one relative altitude information is indicative of a relative value of an altitude;
  determining at least one absolute altitude information associated with a data element of a database comprising map data, wherein the at least one absolute altitude information is indicative of an absolute value of an altitude;
  determining an estimation information based, at least in part, on the determined relative altitude information and, at least in part, on the determined absolute altitude information, wherein the estimation information represents an absolute value of an altitude.

Embodiment 2

The apparatus according to embodiment 1, the at least one memory and the computer program code configured to, with the at least one processor, cause the apparatus further to perform:
  obtaining (e.g. measuring or receiving) the at least one pressure information.

Embodiment 3

The apparatus according to embodiment 1 or embodiment 2, the at least one memory and the computer program code configured to, with the at least one processor, cause the apparatus further to perform:
  obtaining a position information, wherein the absolute altitude information is determined based, at least in part, on the position information.

Embodiment 4

The apparatus according to any of the embodiments 1 to 3, wherein the estimation information is determined by mapping the relative altitude information onto the absolute altitude information.

Embodiment 5

The apparatus according to any of the embodiments 1 to 4, wherein a last known or last determined absolute altitude information is used for the mapping.

Embodiment 6

The apparatus according to any of the embodiments 1 to 5, wherein the map data represents an altitude map.

Embodiment 7

The apparatus according to any of the embodiments 1 to 6, wherein a plurality of pieces of estimation information are determined.

Embodiment 8

The apparatus according to embodiment 7, wherein the plurality of pieces of estimation information are filtered.

Embodiment 9

The apparatus according to any of the embodiments 1 to 8, wherein determining the estimation information comprises filtering a set of absolute altitude information by using a Kalman filter, wherein the set of absolute altitude information comprises at least the absolute altitude information.

Embodiment 10

The apparatus according to embodiment 9, wherein a dynamic model of the Kalman filter is determined based at least in part on the relative altitude information.

Embodiment 11

The apparatus according to any of the embodiments 1 to 10, wherein at least one data element of the map data comprises an altitude value relative to a pre-defined floor of a building and/or an altitude value relative to sea level.

Embodiment 12

The apparatus according to any of the embodiments 1 to 11, the at least one memory and the computer program code configured to, with the at least one processor, cause the apparatus further to perform:
  determining a change from at least one signal from a Global Navigation Satellite System being receivable to no signal from the Global Navigation Satellite System being receivable.

Embodiment 13

The apparatus according to any of the embodiments 1 to 12, the at least one memory and the computer program code configured to, with the at least one processor, cause the apparatus further to perform:
  using estimation information for propagation in response to receiving an altitude estimation request.

Embodiment 14

A method (e.g. performed and/or controlled by at least one apparatus), the method comprising:
  determining at least one relative altitude information based, at least in, part on at least one pressure information, wherein the at least one relative altitude information is indicative of a relative value of an altitude;
  determining at least one absolute altitude information associated with a data element of a database comprising map data, wherein the at least one absolute altitude information is indicative of an absolute value of an altitude;
  determining an estimation information based, at least in part, on the determined relative altitude information and, at least in part, on the determined absolute altitude information, wherein the estimation information represents an absolute value of an altitude.

Embodiment 15

The method according to embodiment 14, the method further comprising:
  obtaining (e.g. measuring or receiving) the at least one pressure information.

Embodiment 16

The method according to embodiment 14 or embodiment 15, the method further comprising:
  obtaining a position information, wherein the absolute altitude information is determined based, at least in part, on the position information.

Embodiment 17

The method according to any of the embodiments 14 to 16, wherein the estimation information is determined by mapping the relative altitude information onto the absolute altitude information.

Embodiment 18

The method according to embodiment 17, wherein a last known or last determined absolute altitude information is used for the mapping.

Embodiment 19

The method according to any of the embodiments 14 to 18, wherein the map data represents an altitude map.

Embodiment 20

The method according to any of the embodiments 14 to 19, wherein a plurality of pieces of estimation information are determined.

Embodiment 21

The method according to embodiment 20, wherein the plurality of pieces of estimation information are filtered.

Embodiment 22

The method according to any of the embodiments 14 to 21, wherein determining the estimation information comprises filtering a set of absolute altitude information by using a Kalman filter, wherein the set of absolute altitude information comprises at least the absolute altitude information.

Embodiment 23

The method according to embodiment 22, wherein a dynamic model of the Kalman filter is determined based at least in part on the relative altitude information.

Embodiment 24

The method according to any of the embodiments 14 to 23, wherein at least one data element of the map data comprises an altitude value relative to a pre-defined floor of a building and/or an altitude value relative to sea level.

Embodiment 25

The method according to any of the embodiments 14 to 24, the method further comprising:
  determining a change from at least one signal from a Global Navigation Satellite System being receivable to no signal from the Global Navigation Satellite System being receivable.

Embodiment 26

The method according to any of the embodiments 14 to 25, the method further comprising:
  using estimation information for propagation in response to receiving an altitude estimation request.

Embodiment 27

An apparatus configured to perform and/or control or comprising respective means for performing and/or controlling the method of any of the embodiments 14 to 27.

Embodiment 28

An apparatus comprising at least one processor and at least one memory including computer program code, the at least one memory and the computer program code configured to, with the at least one processor, cause an apparatus at least to perform and/or control the method of any of the embodiments 14 to 27.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code; the computer program code being executable by the at least one processor to cause the apparatus to perform operations comprising:
  determining a global navigation satellite system (GNSS) altitude for a mobile device while the mobile device is in an outdoor area and a database containing an altitude map for at least the outdoor area is not available, wherein the GNSS altitude is based on data from a GNSS receiver;
  determining a global navigation satellite system (GNSS) horizontal location for the mobile device while the mobile device is in the outdoor area and the database containing the altitude map is available, wherein the GNSS horizontal location is based on data from the GNSS receiver, wherein the apparatus has access to the database containing the altitude map for at least the outdoor area, wherein the altitude map indicates a plurality of altitude values respectively for a plurality of locations in the outdoor area, and wherein the plurality of locations include the determined GNSS horizontal location;
  determining an altitude value that is associated with the determined GNSS horizontal location in accordance with the altitude map for at least the outdoor area;
  based at least on the determined altitude value that is associated with the determined GNSS location in accordance with the altitude map, determining an outdoor altitude of the mobile device in the outdoor area;
  detecting (i) subsequent GNSS unavailability or (ii) altitude ambiguity associated with a different location in accordance with the altitude map;
  in response to detecting (i) the subsequent GNSS unavailability or (ii) the altitude ambiguity, tracking an altitude change of the mobile device according to information from a pressure sensor, wherein the altitude change tracking occurs while the mobile device is in an indoor area;
filtering a set of absolute altitude information, including the altitude value from the altitude map, using a Kalman filter based on the tracked altitude change of the mobile device; and
based at least on the filtered set of absolute altitude information for the mobile device in the outdoor area and on the tracked altitude change of the mobile device, determining an indoor altitude of the mobile device in the indoor area,
wherein the mobile device is tracked using the GNSS altitude based on the GNSS receiver, the outdoor altitude based on the altitude map and the GNSS receiver, and the indoor altitude based on the pressure sensor.

2. The apparatus of claim 1, wherein the operations further comprise:
detecting a transition of the mobile device from the outdoor area to the indoor area.

3. The apparatus of claim 2, wherein the transition of the mobile device from the outdoor area to the indoor area is detected based on the detection of the subsequent GNSS unavailability, or the altitude ambiguity.

4. The apparatus of claim 2, wherein triggering the altitude change tracking of the mobile device occurs after or in response to detecting the transition of the mobile device from the outdoor area to the indoor area.

5. The apparatus of claim 1, wherein the outdoor altitude of the mobile device in the outdoor area is associated with an outdoor location in a vicinity of the indoor area.

6. The apparatus of claim 1, wherein the outdoor altitude of the mobile device in the outdoor area is associated with a region around a building including the indoor area.

7. The apparatus of claim 1, wherein a building includes the indoor area and has a plurality of floors, wherein the operations further comprise:
based on the determined indoor altitude of the mobile device, determining a floor, from among the plurality of floors, at which the mobile device is located.

8. The apparatus of claim 1, wherein the set of absolute altitude information is an input to the Kalman filter.

9. The apparatus of claim 8, wherein a dynamic model or state of the Kalman filter is determined based at least in part on the tracked altitude change.

10. A method comprising:
determining a global navigation satellite system (GNSS) altitude for a mobile device while the mobile device is in an outdoor area and a database containing an altitude map for at least the outdoor area is not available, wherein the GNSS altitude is based on data from a GNSS receiver;
determining a global navigation satellite system (GNSS) horizontal location for the mobile device while the mobile device is in the outdoor area and the database containing the altitude map is available, wherein the GNSS horizontal location is based on data from the GNSS receiver, wherein the database contains the altitude map for at least the outdoor area, wherein the altitude map indicates a plurality of altitude values respectively for a plurality of locations in the outdoor area, and wherein the plurality of locations include the determined GNSS horizontal location;
determining an altitude value that is associated with the determined GNSS horizontal location in accordance with the altitude map for at least the outdoor area;

based at least on the determined altitude value that is associated with the determined GNSS location in accordance with the altitude map, determining an outdoor altitude of the mobile device in the outdoor area;
detecting (i) subsequent GNSS unavailability, or (ii) altitude ambiguity associated with a different location in accordance with the altitude map;
in response to detecting (i) the subsequent GNSS unavailability, or (ii) the altitude ambiguity, tracking an altitude change of the mobile device according to information from a pressure sensor, wherein the altitude change tracking occurs while the mobile device is in an indoor area;
filtering a set of absolute altitude information, including the altitude value from the altitude map, using a Kalman filter based on the tracked altitude change of the mobile device; and
based at least on the filtered set of absolute altitude information for the mobile device in the outdoor area and on the tracked altitude change of the mobile device, determining an indoor altitude of the mobile device in the indoor area,
wherein the mobile device is tracked using the GNSS altitude based on the GNSS receiver, the outdoor altitude based on the altitude map and the GNSS receiver, and the indoor altitude based on the pressure sensor.

11. The method of claim 10, further comprising:
detecting a transition of the mobile device from the outdoor area to the indoor area.

12. The method of claim 11, wherein the transition of the mobile device from the outdoor area to the indoor area is detected based on the detection of the subsequent GNSS unavailability, or the altitude ambiguity.

13. The method of claim 11, wherein triggering the altitude change tracking of the mobile device occurs after or in response to detecting the transition of the mobile device from the outdoor area to the indoor area.

14. The method of claim 10, wherein the outdoor altitude of the mobile device in the outdoor area is associated with an outdoor location in a vicinity of the indoor area.

15. The method of claim 10, wherein the outdoor altitude of the mobile device in the outdoor area is associated with a region around a building including the indoor area.

16. A non-transitory computer-readable medium storing computer program code, the computer program code when executed by a processor causing an apparatus to perform and/or control:
determining a global navigation satellite system (GNSS) altitude for a mobile device while the mobile device is in an outdoor area and a database containing an altitude map for at least the outdoor area is not available, wherein the GNSS altitude is based on data from a GNSS receiver;
determining a global navigation satellite system (GNSS) horizontal location for the mobile device while the mobile device is in the outdoor area and the database containing the altitude map is available, wherein the GNSS horizontal location is based on data from the GNSS receiver, wherein the database contains the altitude map for at least the outdoor area, wherein the altitude map indicates a plurality of altitude values respectively for a plurality of locations in the outdoor area, and wherein the plurality of locations include the determined GNSS horizontal location;

determining an altitude value that is associated with the determined GNSS horizontal location in accordance with the altitude map for at least the outdoor area;

based at least on the determined altitude value that is associated with the determined GNSS location in accordance with the altitude map, determining an outdoor altitude of the mobile device in the outdoor area;

detecting (i) subsequent GNSS unavailability, or (ii) altitude ambiguity associated with a different location in accordance with the altitude map;

in response to detecting (i) the subsequent GNSS unavailability, or (ii) the altitude ambiguity, tracking an altitude change of the mobile device according to information from a pressure sensor, wherein the altitude change tracking occurs while the mobile device is in an indoor area; and based at least on the tracked altitude change of the mobile device, determining an indoor altitude of the mobile device in the indoor area, wherein the mobile device is tracked using the GNSS altitude based on the GNSS receiver, the outdoor altitude based on the altitude map and the GNSS receiver, and the indoor altitude based on the pressure sensor.

17. The tangible computer-readable medium of claim 16, the computer program code when executed by the processor causing the apparatus to perform and/or control:
   detecting a transition of the mobile device from the outdoor area to the indoor area.

18. The tangible computer-readable medium of claim 17, wherein triggering the altitude change tracking of the mobile device occurs after or in response to detecting the transition of the mobile device from the outdoor area to the indoor area.

19. The tangible computer-readable medium of claim 16, wherein the outdoor altitude of the mobile device in the outdoor area is associated with an outdoor location in a vicinity of the indoor area.

20. The tangible computer-readable medium of claim 16, the computer program code when executed by a processor causing an apparatus to perform and/or control:
   filtering a set of absolute altitude information, including the altitude value from the altitude map, using a Kalman filter based on the tracked altitude change of the mobile device.

* * * * *